(12) United States Patent
Lindgren et al.

(10) Patent No.: US 7,074,174 B2
(45) Date of Patent: Jul. 11, 2006

(54) METHODS AND APPARATUS FOR ENCAPSULATING HAZARDOUS DEBRIS

(75) Inventors: Gary F. Lindgren, Zionsville, IN (US); Steven C. Danenman, Indianapolis, IN (US)

(73) Assignee: Heritage Environment Services, LLC, Indianapolis, IN (US)

( * ) Notice: Subject to any disclaimer, the term of this patent is extended or adjusted under 35 U.S.C. 154(b) by 314 days.

(21) Appl. No.: 10/146,602

(22) Filed: May 15, 2002

(65) Prior Publication Data

US 2003/0216607 A1  Nov. 20, 2003

(51) Int. Cl.
*A62D 3/00* (2006.01)

(52) U.S. Cl. ........................ 588/258; 588/252; 588/256; 588/259

(58) Field of Classification Search ............... 588/249, 588/250, 252, 258, 259, 256
See application file for complete search history.

(56) References Cited

U.S. PATENT DOCUMENTS

| | | | |
|---|---|---|---|
| 1,419,085 A | 6/1922 | Unser | |
| 2,712,797 A | 7/1955 | Woehrle et al. | |
| 2,876,927 A | 3/1959 | Henning | |
| 3,508,677 A | 4/1970 | Laibson et al. | |
| 3,664,904 A | 5/1972 | Cook | |
| 4,186,845 A | 2/1980 | Podd | |
| 4,256,806 A | 3/1981 | Snyder | |
| 4,332,845 A | 6/1982 | Nawata et al. | |
| 4,385,953 A | 5/1983 | Beck | |
| 4,430,288 A | 2/1984 | Bonis | |
| 4,557,400 A | 12/1985 | Clarke | |
| 4,713,273 A | 12/1987 | Freedman | |
| 4,756,937 A | 7/1988 | Mentzer | |
| 4,868,025 A | 9/1989 | Strzelewicz | |
| 4,875,596 A | 10/1989 | Lohse | |
| 5,110,005 A | 5/1992 | Schilling | |
| 5,143,245 A | 9/1992 | Malone | |
| 5,147,061 A | 9/1992 | Karpisek | |
| 5,163,555 A | 11/1992 | West et al. | |
| 5,183,086 A | 2/1993 | Fanta et al. | |
| 5,225,256 A | 7/1993 | Marano et al. | |
| 5,225,812 A | 7/1993 | Faghri | |
| 5,264,276 A | 11/1993 | McGregor et al. | |
| 5,365,013 A * | 11/1994 | Aulson | 588/249 |
| 5,399,418 A | 3/1995 | Hartmanns et al. | |
| 5,457,271 A * | 10/1995 | Aulson | 588/249 |
| 5,499,743 A | 3/1996 | Blumenkron | |
| 5,509,715 A | 4/1996 | Scharpf | |
| 5,536,898 A * | 7/1996 | Conner et al. | 588/252 |
| 5,645,518 A * | 7/1997 | Wagh et al. | 588/318 |
| 5,647,400 A | 7/1997 | Jani et al. | |
| 5,649,323 A | 7/1997 | Kalb et al. | |
| 5,655,679 A | 8/1997 | Schutz | |

(Continued)

*Primary Examiner*—Cam N. Nguyen
(74) *Attorney, Agent, or Firm*—Baker & Daniels LLP

(57) ABSTRACT

A method of collecting, treating, transporting and disposing of hazardous debris which combines the standards of macroencapsulation and microencapsulation and involves the use of a liner to contain hazardous debris together with reagents that reduce leachability of a constituent of the hazardous debris. The liner is supported in a rolloff box or other transportable container on site where the hazardous debris is collected. Prior to placing hazardous debris into the liner, a layer of reagent(s) is provided in the bottom of the liner. Once hazardous debris is loaded in the liner, addition free flowing reagent(s) is/are added to fill void space in and around the hazardous debris, after which the top of the liner is sealed for disposal in a landfill.

24 Claims, 1 Drawing Sheet

U.S. PATENT DOCUMENTS

| | | |
|---|---|---|
| 5,709,937 A | 1/1998 | Adams et al. |
| 5,732,364 A | 3/1998 | Kalb et al. |
| 5,810,478 A | 9/1998 | LaFleur |
| 5,926,772 A | 7/1999 | Kalb et al. |
| 5,980,446 A * | 11/1999 | Loomis et al. .............. 588/250 |
| 6,019,237 A | 2/2000 | Durham et al. |
| 6,120,817 A | 9/2000 | Archibald et al. |
| 6,155,446 A | 12/2000 | Alexander et al. |
| 6,155,772 A * | 12/2000 | Beale ......................... 414/607 |
| 6,186,713 B1 | 2/2001 | Bonerb |
| 6,399,849 B1 * | 6/2002 | Kalb et al. .................... 588/15 |
| 6,450,356 B1 * | 9/2002 | Alexander et al. ....... 220/23.91 |

\* cited by examiner

METHODS AND APPARATUS FOR ENCAPSULATING HAZARDOUS DEBRIS

TECHNICAL FIELD

The present invention relates methods and apparatus for safely disposing of waste materials. More specifically, the present invention is directed to methods and apparatus for safely handling, treating, transporting and disposing of hazardous debris.

BACKGROUND ART

Hazardous debris is often generated during industrial maintenance, spill response, and building decontamination projects. Such debris can include piping, pumps, valves, duct work, process tanks, wooden and concrete flooring, spill control booms, personnel protective equipment (PPE) and an almost infinite variety of other items. In terms of waste disposal, debris is defined as a solid material that has a particle size exceeding a 60 mm and that is a manufactured object, plant or animal matter, or natural geologic material. Contaminated soil and process wastes are not debris. In order to qualify for debris treatment standards, any mixture of debris and process waste must be composed primarily of debris, by volume, based upon visual inspection.

Generally, waste materials and debris are placed in rolloff boxes, dumpsters, waste carts, railcars, dump trucks and other conventional transportable containers, and transported therein to an appropriate site for disposal. Disposal sites are typically landfills, such as sanitary, industrial or hazardous waste landfills. While these known transportable containers may be suitable for some types of waste materials, they are unsuitable for many others. For example, hazardous debris may not be safely disposed by means of these known containers.

The United States Environmental Protection Agency (USEPA) treatment standards for hazardous debris as set forth in 40 CFR §268.45 provides for alternative treatments for debris prior to landfill disposal. Among these alternative treatment standards are immobilization technologies that include macroencapsulation and microencapsulation.

The technology of macroencapsulation is described in the Code as "Application of surface coating materials such as polymeric organics (e.g., resins and plastics) or use of a jacket of inert inorganic materials to substantially reduce surface exposure to potential leaching media."

The performance and/or design and operating standard for macroencapsulation is described in the Code as "Encapsulating material must completely encapsulate debris and be resistant to degradation by the debris and its contaminants and materials into which it may come into contact after placement (leachate, other waste, microbes)."

The technology of microencapsulation is described in the Code as "Stabilization of the debris with the following reagents (or waste reagents) such that the leachability of the hazardous contaminates is reduced: (1) Portland cement; or (2) lime/pozzolans (e.g., fly ash and cement kiln dust). Reagents (e.g., iron salts, silicates, and clays) may be added to enhance the set/cure time and/or compressive strength, or to reduce the leachability of the hazardous constituents."

The performance and/or design and operating standard for macroencapsulation is described in the Code as "Leachability of the hazardous contaminates must be reduced." This reduction in leachability requires that intimate contact occur between the virgin or waste reagents and the surfaces contaminated by hazardous wastes. This restricts the application of microencapsulation for many commonly encountered debris types, such as piping, pumps, valves, ductwork, etc. where the generator or contractor is unable or unwilling to expose the surfaces for purposes of reagent contact. Also, this limits the amount of reagent addition at the Resource Conservation and Recovery Act (RCRA) hazardous waste Treatment Storage or Disposal facility (TSD), or else the RCRA TSD has to off-load and reload the rolloff box, in some cases making two or more boxes out of one after reagent addition.

As noted above, macroencapsulation has a performance standard that the debris must be completely encapsulated and the encapsulating material must be resistant to degradation by the debris, its contaminates, leachates and other waste in the landfill, and microbes. Standard rolloff box liners do not meet this performance standard, and much macroencapsulation is being done at the RCRA TSD land disposal facility by virtue of addition of concrete to meet this performance standard. If concrete were added at the collection site, the resulting rolloff box would exceed legal weight limits and thus not be able to be moved on public roadways.

The use of conventional rolloff boxes with hazardous debris would not be acceptable because the rolloff boxes do not microencapsulate or seal the hazardous debris. Yet, the use of conventional transportable waste containers, such as rolloff boxes, is highly desirable from the standpoint of transporting waste material such as debris, to the eventual disposal site.

In addition to the problems associated with collecting waste debris from industrial sites, spill sites, decontamination projects, etc., and safely transporting the waste debris to an appropriate site for treatment and disposal, often the waste debris has to be offloaded and sorted for proper identification, treatment and disposable. For example, an industrial site spill caused by processing equipment failure may produce waste debris in the form of chemical contaminated broken processing equipment. Cleanup of the spill can generate additional debris in the form of chemical (neutralizing compounds, cleaning materials, etc.) contaminated cleanup equipment, including protective clothing, booms, hoses, etc. In addition to this debris that is directly associated with the chemical process and cleanup equipment, contaminated objects or structures proximal to the spill site can include furniture, fixtures, shelving, bins, flooring, etc. all of which may be collected as waste debris from an industrial site.

If the waste debris is not properly classified or treated when collected, it may have to be offloaded and sorted. The offloading and sorting of waste debris is a time-consuming process that requires containment facilities and exposes workers to addition hazards.

The present invention provides methods and apparatus for safely disposing of waste materials which is an improvement over present methods which addresses the limitations of both microencapsulation and macroencapsulation.

DISCLOSURE OF THE INVENTION

According to various features, characteristics and embodiments of the present invention which will become apparent as the description thereof proceeds, the present invention provides a method for preparing hazardous debris for landfill disposal which involves:

providing a transportable container at a hazardous debris collection site, the transportable container including a bottom, side walls, end walls and a top;

adding a layer of at least one treatment reagent to the bottom of the transportable container;

adding hazardous debris obtained from the hazardous debris collection site into the transportable container while maintaining a free space between the added hazardous debris and the side walls, end walls and top of the transportable container;

after loading the hazardous debris into the transportable container, adding at least one additional free flowing reagent into the free space between the added hazardous debris and the side walls, end walls and top of the transportable container; and closing the top of the transportable container.

The present invention further provides a method for preparing hazardous debris for landfill disposal which involves:

providing a transportable container at a hazardous debris collection site, the transportable container including a bottom, side walls, end walls and a top;

positioning a liner in the transportable container, the liner having a bottom, opposed side and end walls and a top;

adding a layer of at least one treatment reagent to the bottom of the liner;

adding hazardous debris obtained from the hazardous debris collection site into the liner while maintaining a free space between the added hazardous debris and the side walls, end walls and top of the liner;

after loading the hazardous debris into the liner, adding at least one additional free flowing reagent into the free space between the added hazardous debris and the side walls, end walls and top of the liner; and closing the top of the liner.

The present invention also provides a method for preparing hazardous debris for landfill disposal which involves:

collecting hazardous debris from a collection site;

contacting the collected hazardous debris with at least one reagent that reduces leachability of a constituent of the hazardous debris; and containing and burying the collected hazardous debris and the at least one reagent in a liner that reduces exposure of the collected hazardous debris to potential leaching media in a landfill.

The present invention further provides a liner for containing hazardous debris having a top, side and end walls and a bottom, which liner includes:

an outer woven layer;

an intermediate liquid-impervious layer;

an inner padded layer;

at least one closure flap on the top thereof; and a plurality of support straps provided at the top of the liner.

BRIEF DESCRIPTION OF DRAWINGS

The present invention will be described with reference to the attached drawings which are given as non-limiting examples only, in which.

BEST MODE FOR CARRYING OUT THE INVENTION

The present invention addresses the limitations of both conventional microencapsulation and conventional macroencapsulation and offers superior environmental protection as well. The process of the present invention, dubbed "MiacroEncapsulation" by the inventors, also addresses the various and often mixed types of hazardous wastes found in debris, including organic solvents, heavy metals, and cyanides, depending upon which reagent or reagent combination is utilized in the process.

Treatment of wastes according to the present invention can be performed at the generator's site (under the exclusions from permitting for generator treatment), or at a RCRA TSD treatment facility.

Treatment initially involves site inspection to determine what hazardous constituents are present and which hazardous waste codes are applicable. Visual inspections and sampling can be performed as necessary. In addition, photographs can be obtained to provide a permanent record of the site. Debris that already loaded into containers such as drums or rolloff boxes may need to be unloaded for inspection and sampling. The results of the visual inspection and sampling are used to determined treatment protocol, reagents to be used, and reagent dosage.

The debris is loaded into a rolloff box provided with a sealable containment or rolloff box liner as discussed below. Excessive process waste adhering to the debris surfaces can be removed and handled and treated separately from the debris.

Figure 1:
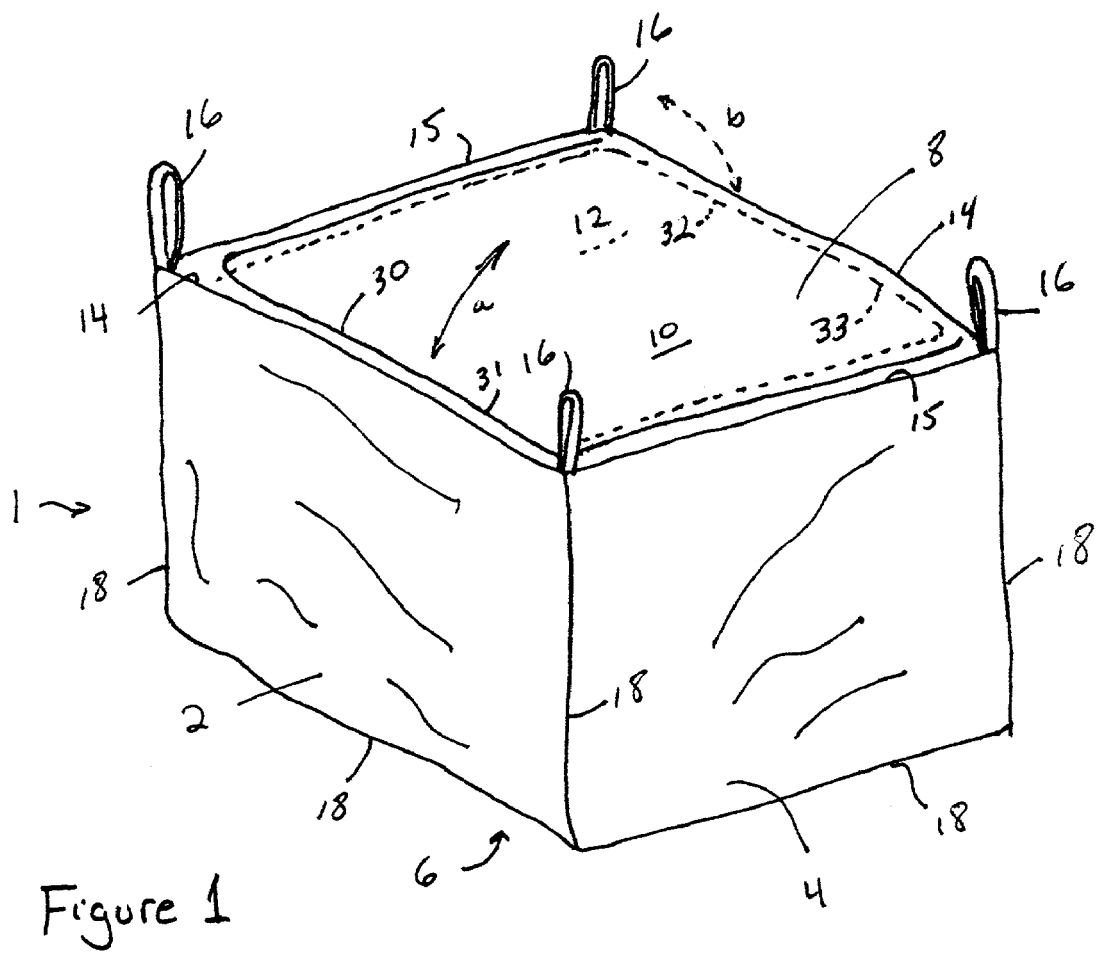
FIG. 1 is a perspective view of a rolloff box liner according to one embodiment of the present invention.

FIG. 1 is a perspective view of a rolloff box liner according to one embodiment of the present invention. The rolloff box liner 1 depicted in FIG. 1 has a generally rectangular configuration which is dimensioned to be received in and line a standard, e.g., 20 cubic yard, rolloff box.

The rolloff box liner 1 includes opposed side walls 2, opposed end walls 4, a bottom 6 and a top 8, that as discussed below, includes overlapping closeable flaps 10, 12. The rolloff box liner 1 is provided along the top edge 14 of at least the side walls 2 with support straps 16 that are used as discussed below to secure the side walls 2 to the inner walls of a rolloff box and ensure that the rolloff box liner, which is not self-supporting, does not slump or become folded under during debris loading. Although the rolloff box liner 1 in FIG. 1 is depicted as having support straps 16 in the top corners thereof, it is to be understood that any number of intermediate support straps 16 could be provided between the top corners alone the top edges 14 of the side walls 2, and the top edges 15 of the end walls 4. The seams 18 between the side walls 2, end walls 4 and bottom 6 of the rolloff box liner are continuous to provide containment for reagents that are used to treat debris.

Figure 2:
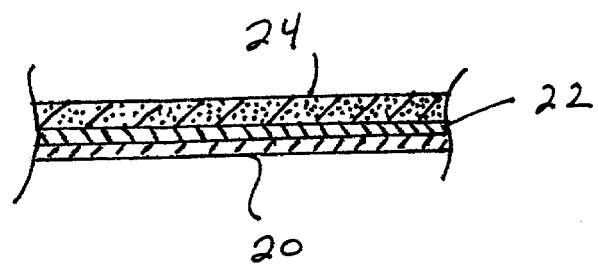
FIG. 2 is cross-sectional view of a rolloff box liner according to one embodiment of the present invention.

FIG. 2 is cross-sectional view of a rolloff box liner according to one embodiment of the present invention. The side walls 2, end walls, 4, bottom 6 and top of the rolloff box liner 1 comprises a multi-layered construction as depicted in FIG. 1, which includes an outer layer 20 formed from a tear and puncture resistant material such as woven polypropylene or polyethylene or other suitable synthetic polymeric material. The rolloff box liner 1 includes an intermediate layer 22 formed from a high density polyethylene film, a high density polypropylene film or other suitable chemical resistant and liquid-impervious synthetic polymeric material. The rolloff box liner 1 also includes an innermost layer 24 which serves as a pad to protect the rolloff box liner when debris is loaded therein. The innermost layer can be a pad, mat or membrane formed from a polyolefin or polyester such as polytetrafluorethylene (PTFE) known as Gortex® available from W. L. Gore, Inc. The thickness of the outermost layer 20, intermediate layer 22 and innermost layer 24 can be varied depending on the overall size of the rolloff box liner 1. An exemplary embodiment of a rolloff box liner 1 includes an outermost layer 20 of 20 mil polypropylene, an intermediate layer 22 of 6 mil high density polyethylene (HDPE), and an inner most layer 24 of polypropylene non-woven geotextile (16 oz/ft$^2$). The support straps 16 can be made from nylon webbing material and are attached at least to the outermost layer 20.

The outermost, intermediate and innermost layers 20, 22, 24 can be nested together and, if desired, attached at discrete areas to one another in any convenient fashion, such as by adhesive bonding. In an alternative embodiment, the outermost, intermediate and innermost layers 20, 22, 24 can be stitched or sown together at the bottom, top and side edges.

As noted above, the top of the rolloff box liner includes at least two overlapping closure flaps 10, 12. The outer closure flap 10 is formed of the outermost layer 20 and the intermediate layer 22 and has a zipper mechanism 30 by which the outer closure flap 10 can be closed as depicted in FIG. 1. The inner closure flap 12 is formed from the innermost layer 24 and has a zipper mechanism (depicted in phantom lines) 32 by which the inner closure flap 12 can be closed as depicted in phantom in FIG. 1. The outer and inner closure flaps 10, 12 are configured so that they hinge on opposite sides of the rolloff box liner 1. The free edge 31 of the outer closure flap 10 can pivot between its open and closed position as indicated by double headed arrow "a" and the free edge 33 of the inner closure flap 12 can pivot between its open and closed position as indicated by double headed arrow "b" (when outer closure flap 10 is in its open position.). In alternative embodiments, snaps, ties, clips, etc. could be used to secure the closure flaps 10, 12 in their closed positions. It is also possible to include a separate closure flaps for each of the layers of the rolloff box liner 1, or a single closure flap for the rolloff box liner 1. It is also possible to include, in addition to the outermost, intermediate and innermost layers 20, 22, 24 discussed above, other layers as desired for additional strength and/or protection. It is further noted that the liner construction described herein is not necessary limited to a rolloff box liners. Similar constructions and designs can be used to provide liners for dumpsters, waste carts, railcars, dump trucks and other conventional transportable and non-transportable containers.

Prior to installing the rolloff box liner 1 in a rolloff box, a layer of polyethylene sheeting can be placed in the bottom of the rolloff box in order to ensure smooth movement of the rolloff box liner when the rolloff box liner is unloaded from the rolloff box. A polyethylene layer having a thickness of approximately 6 mils can be used for this purpose.

Once the rolloff box rolloff box liner 1 is installed in a rolloff box with the sides secured by the support straps 16, a six to twelve inch layer of treatment reagent(s) is first placed in the rolloff box liner, prior to placing debris therein. This initial or base layer both protects the rolloff box liner 1 from damage during subsequent loading and ensures that the loaded debris and any free liquids that separate from the debris come into contact with the treatment reagent(s) during: 1) loading; 2) the accumulation period (up to 90 days); 3) transportation; and 4) final disposal.

Debris is loaded into the rolloff box liner 1 while maintaining a buffer zone or free space at the sides and ends and maintaining a six to twelve inch head space at the top of the rolloff box. Debris should be carefully loaded so as to prevent unnecessary damage to the rolloff box liner 1. Sharp edges, such as the ends of pointed objects like piping should be duct taped before loading. Free liquids should be drained from the debris prior to loading. Some hazardous constituents such as cyanide and hexavalent chromium contaminated debris can be pretreated on site with proper reagents such as gelled sodium hypochlorite or gelled sodium metabisulfite before being loaded.

Once the rolloff box liner 1 is loaded to a maximum volume (allowing for the side and end buffer zones and head space), free flowing reagents are added which have been chosen based upon initial site inspection, hazardous waste codes and treat protocols. The free flowing reagents can be added from bags, cubic yard stacks, silos or other bulk supply sources on site.

For heavy metal contamination, lime, fly ash, Portland cement, or other alkaline reagents are added to ensure the slurry pH of the material is in an alkaline range that is sufficient to minimize heavy metal solubility.

For cyanide contaminated debris, sodium or calcium hypochlorite, or other suitable chemical oxidants can be added.

For organic solvent contaminated debris, various forms of carbon, including, but not limited to, granular and/or powdered activated carbon can be added.

Overall, the use of dry, free flowing reagents ensures that irregular void spaces in and surrounding the debris are sufficiently contacted and that the prohibitions on free liquid transportation in rolloff boxes are adhered to.

After reagent addition, the closure flaps 10, 12 of the rolloff box liner 1 are placed in position and the zipper mechanisms 30, 32 are used to seal the waste inside the rolloff box liner 1, effectively isolating the debris and reagent from the environment during accumulation, transportation and through ultimate disposal.

Although any type of rolloff box or other transportable container can be used according to the present invention, a rolloff box with a side hinged tailgate is preferred because such a rolloff box will minimize the chances of damaging the rolloff box liner 1 during unloading. Once the rolloff box has been transported to a RCRA TSD land disposal facility, the tailgate of the rolloff box is opened and the debris-filled rolloff box liner 1 is slid out of the rolloff box and positioned in a desired location in the landfill.

It is to be understood that the waste treating protocol of the present invention is not limited to the rolloff box liner of FIGS. 1 and 2. In this regard, the broad concept of combining the standards of macroencapsulation and microencapsulation can be accomplished as discussed herein using other liner designs and configurations, including liners that are used in conjunction with dumpsters, waste carts, railcars, dump trucks and other conventional transportable and non-transportable containers.

The waste treatment method of the present invention ensures both adequate treatment and the necessary long term isolation of debris from other wastes and leachates in RCRA TSD land disposal facilities, and is superior to both microencapsulation and macroencapsulation as individual, discretely applied treatment alternatives.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method for preparing hazardous debris for landfill disposal which comprises:

providing a transportable container at a hazardous debris collection site, the transportable container including a bottom, side walls, end walls and a top;

adding a layer of at least one treatment reagent to the bottom of the transportable container;

adding hazardous debris obtained from the hazardous debris collection site into the transportable container while maintaining a free space between the added hazardous debris and the side walls, end walls and top of the transportable container;

after loading the hazardous debris into the transportable container, adding at least one additional free flowing reagent into the free space between the added hazardous debris and the side walls, end walls and top of the transportable container; and closing the top of the transportable container.

2. A method for preparing hazardous debris for landfill disposal according to claim 1, wherein the transportable container comprises a liner.

3. A method for preparing hazardous debris for landfill disposal according to claim 2, further comprising transporting the liner to a landfill site and burying the liner in the landfill site.

4. A method for preparing hazardous debris for landfill disposal according to claim 2, wherein the transportable container comprises a liner that is positioned in a rigid transportable container selected from the group consisting of a rolloff box, a dumpster, a cart, a railcar and a dump truck.

5. A method for preparing hazardous debris for landfill disposal according to claim 4, further comprising transporting the rigid transportable container with the liner therein to a landfill site and burying the liner in the landfill site.

6. A method for preparing hazardous debris for landfill disposal according to claim 2, wherein the liner comprises an outer woven layer, an intermediate liquid-impervious layer and an inner padded layer.

7. A method for preparing hazardous debris for landfill disposal according to claim 6, wherein the liner includes a top that comprises at least one closure flap.

8. A method for preparing hazardous debris for landfill disposal according to claim 7, wherein the liner comprises at least two overlapping closure flaps.

9. A method for preparing hazardous debris for landfill disposal according to claim 1, wherein the hazardous debris collection site comprises at least one of an industrial site, a hazardous material spill site, and a building decontamination project.

10. A method for preparing hazardous debris for landfill disposal according to claim 1, wherein each of the at least one treatment reagent and the at least one additional free flowing reagent comprise dry reagents.

11. A method for preparing hazardous debris for landfill disposal which comprises:

providing a transportable container at a hazardous debris collection site, the transportable container including a bottom, side walls, end walls and a top;

positioning a liner in the transportable container, the liner having a bottom, opposed side and end walls and a top;

adding a layer of at least one treatment reagent to the bottom of the liner;

adding hazardous debris obtained from the hazardous debris collection site into the liner while maintaining a free space between the added hazardous debris and the side walls, end walls and top of the liner;

after loading the hazardous debris into the liner, adding at least one additional free flowing reagent into the free space between the added hazardous debris and the side walls, end walls and top of the liner; and closing the top of the liner.

12. A method for preparing hazardous debris for landfill disposal according to claim 11, wherein the transportable container is selected from the group consisting of a rolloff box, a dumpster, a cart, a railcar and a dump truck.

13. A method for preparing hazardous debris for landfill disposal according to claim 12, further comprising transporting the transportable container with the liner therein to a landfill site and burying the liner in the landfill site.

14. A method for preparing hazardous debris for landfill disposal according to claim 11, wherein the liner includes support straps and is supported by the support straps in the transportable container.

15. A method for preparing hazardous debris for landfill disposal according to claim 11, wherein the liner comprises an outer woven layer, an intermediate liquid-impervious layer and an inner padded layer.

16. A method for preparing hazardous debris for landfill disposal according to claim 11, wherein the top of the liner comprises at least one closure flap.

17. A method for preparing hazardous debris for landfill disposal according to claim 16, wherein the top of the liner comprises at least two overlapping closure flaps.

18. A method for preparing hazardous debris for landfill disposal according to claim 11, wherein the hazardous debris collection site comprises at least one of an industrial site, a hazardous material spill site, and a building decontamination project.

19. A method for preparing hazardous debris for landfill disposal according to claim 11, wherein each of the at least one treatment reagent and the at least one additional free flowing reagent comprise dry reagents.

20. A method for preparing hazardous debris for landfill disposal which comprises:

collecting hazardous debris from a collection site;

contacting the collected hazardous debris with at least one reagent that reduces leachability of a constituent of the hazardous debris; and containing and burying the collected hazardous debris and the at least one reagent in a liner that reduces exposure of the collected hazardous debris to potential leaching media in a landfill.

21. A method for preparing hazardous debris for landfill disposal according to claim 20, wherein the collection site comprises at least one of an industrial site, a hazardous material spill site, and a building decontamination project.

22. A method for preparing hazardous debris for landfill disposal according to claim 20, wherein the liner comprises an outer woven layer, an intermediate liquid-impervious layer and an inner padded layer.

23. A method for preparing hazardous debris for landfill disposal according to claim 20, wherein the liner includes a top that comprises at least one closure flap.

24. A method for preparing hazardous debris for landfill disposal according to claim 23, wherein the top of the liner comprises at least two overlapping closure flaps.

* * * * *